US012652696B2

(12) United States Patent
Wu et al.

(10) Patent No.: US 12,652,696 B2
(45) Date of Patent: Jun. 9, 2026

(54) HARQ FEEDBACK TRANSMISSION FOR SIDELINK COMMUNICATION IN UNLICENSED SPECTRUM

(71) Applicant: QUALCOMM Incorporated, San Diego, CA (US)

(72) Inventors: Shuanshuan Wu, San Diego, CA (US); Arthur Gubeskys, San Diego, CA (US); Stelios Stefanatos, San Diego, CA (US); Parisa Cheraghi, Cambridge (GB); Yisheng Xue, San Diego, CA (US); Jing Sun, San Diego, CA (US); Xiaoxia Zhang, San Diego, CA (US)

( * ) Notice: Subject to any disclaimer, the term of this patent is extended or adjusted under 35 U.S.C. 154(b) by 389 days.

(21) Appl. No.: 18/006,832

(22) PCT Filed: Sep. 29, 2021

(86) PCT No.: PCT/US2021/071647
§ 371 (c)(1),
(2) Date: Jan. 25, 2023

(87) PCT Pub. No.: WO2022/073010
PCT Pub. Date: Apr. 7, 2022

(65) Prior Publication Data
US 2023/0276490 A1 Aug. 31, 2023

(30) Foreign Application Priority Data
Sep. 30, 2020 (GR) .............................. 20200100594

(51) Int. Cl.
*H04W 74/04* (2009.01)
*H04L 1/1812* (2023.01)

(52) U.S. Cl.
CPC ........... *H04W 74/04* (2013.01); *H04L 1/1812* (2013.01)

(58) Field of Classification Search
CPC ............................. H04W 74/04; H04L 1/1812
See application file for complete search history.

(56) References Cited

U.S. PATENT DOCUMENTS

2020/0127796 A1    4/2020  Li et al.
2020/0351669 A1*  11/2020  Xu ........................ H04W 76/14
(Continued)

FOREIGN PATENT DOCUMENTS

CN       105553612 A      5/2016
CN       108702795 A     10/2018
(Continued)

OTHER PUBLICATIONS

ETRI: "Unicast, Groupcast/broadcast, and Relay for Public Safety D2D Communications", 3GPP Draft, 3GPP TSG-RAN1 Meeting #74, R1-133181, 3rd Generation Partnership Project (3GPP), Mobile Competence Centre ; 650, Route Des Lucioles ; F-06921 Sophia-Antipolis Cedex; France, vol. RAN WG1, No. Barcelona, Spain; Aug. 19, 2013-Aug. 23, 2013, XP050716390, 11 pages, Aug. 10, 2013 (Aug. 10, 2013), p. 5-p. 7.
(Continued)

*Primary Examiner* — Yemane Mesfin
*Assistant Examiner* — Salma Ayad

(57) ABSTRACT

In one aspect, a method of wireless communication includes receiving, by a user equipment (UE), a sidelink transmission in a first slot of an unlicensed channel. The method also includes performing, by the UE, a Channel Access (CA) operation for a hybrid automatic repeat request (HARQ) feedback transmission in a second slot for the sidelink transmission, where the second slot is one of multiple slots configured for HARQ feedback for the sidelink transmission. The method further includes transmitting, by the UE, HARQ feedback transmission in the second slot based on (Continued)

PSFCH resource set 1

PSFCH resource set 2 successfully performing the CA operation. Other aspects and features are also claimed and described.

30 Claims, 8 Drawing Sheets

(56) References Cited

U.S. PATENT DOCUMENTS

| | | | | |
|---|---|---|---|---|
| 2022/0015071 | A1* | 1/2022 | Hui | H04W 72/56 |
| 2023/0069882 | A1* | 3/2023 | Zhao | H04L 5/0053 |
| 2023/0146718 | A1* | 5/2023 | Lei | H04W 72/25 |
| | | | | 370/329 |
| 2023/0156779 | A1* | 5/2023 | Jiang | H04W 74/002 |
| | | | | 370/329 |
| 2023/0292360 | A1 | 9/2023 | Wu et al. | |
| 2023/0345529 | A1* | 10/2023 | Van Phan | H04W 74/002 |

FOREIGN PATENT DOCUMENTS

| | | | |
|---|---|---|---|
| CN | 111245579 | A | 6/2020 |
| CN | 111566979 | A | 8/2020 |
| WO | WO-2019216800 | A1 | 11/2019 |
| WO | WO-2019242378 | A1 | 12/2019 |
| WO | WO-2020144787 | A1 | 7/2020 |
| WO | 2022072366 | A1 | 4/2022 |

OTHER PUBLICATIONS

International Search Report and Written Opinion—PCT/US2021/071647—ISA/EPO—Jan. 27, 2022.
ZTE: "Discussion on the UL LBT for LAA", 3GPP Draft, 3GPP TSG RAN WG1 Meeting #83, R1-156993, Discussion on the UL LBT for LAA_V1.2, 3rd Generation Partnership Project (3GPP), Mobile Competence Centre, 650, Route Des Lucioles, F-06921 Sophia-Antipolis Cedex, France, vol. RAN WG1, No. Anaheim, USA, Nov. 15, 2015-Nov. 22, 2015, Nov. 15, 2015 (Nov. 15, 2015), XP051003304, 10 Pages, section 3.2.

* cited by examiner

100

115i
115j
115k
115h
115g
115f
105e
105f
115e
105d
115d
105b
115b
115a
115c
105a
105c

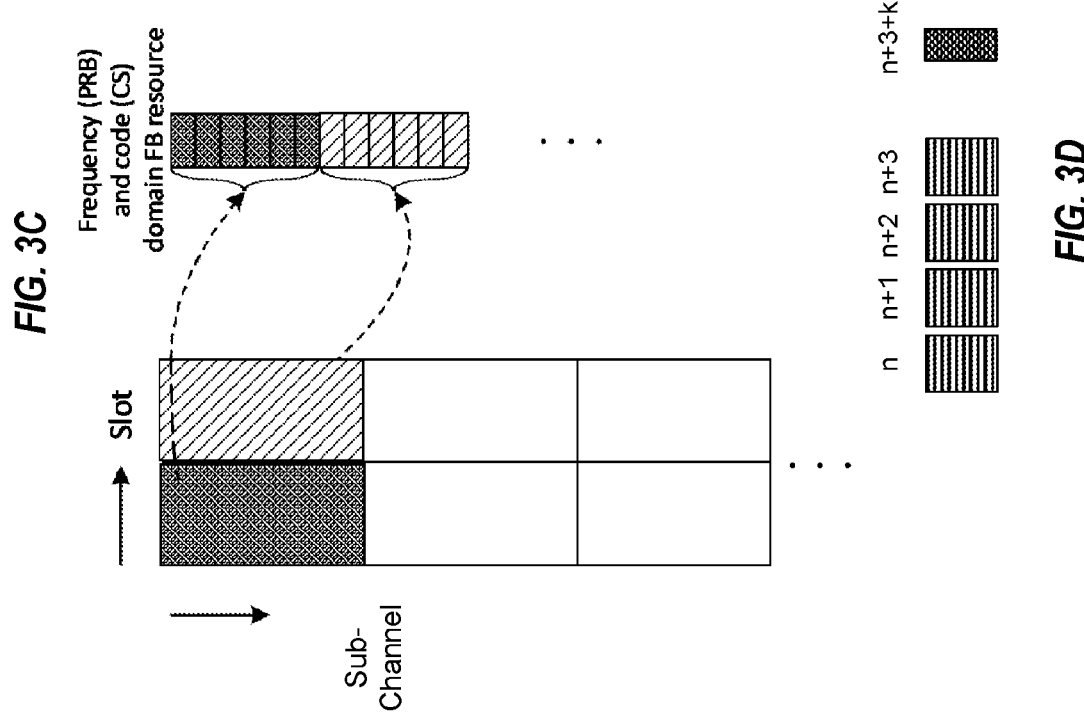
*FIG. 3C*
*FIG. 3D*
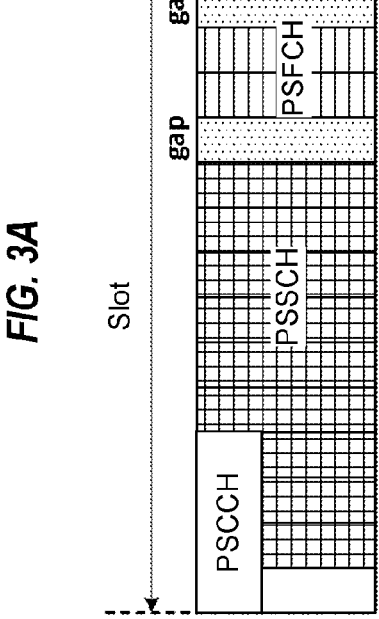
*FIG. 3A*
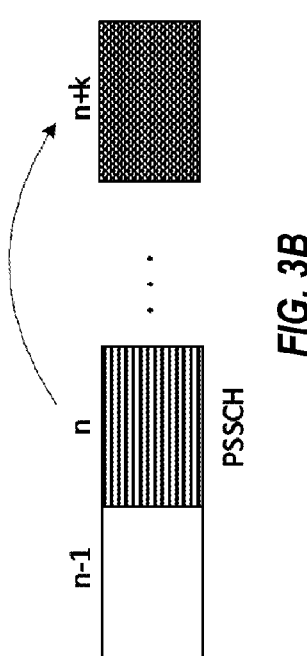
*FIG. 3B*

PSFCH resource set 1

PSFCH resource set 2

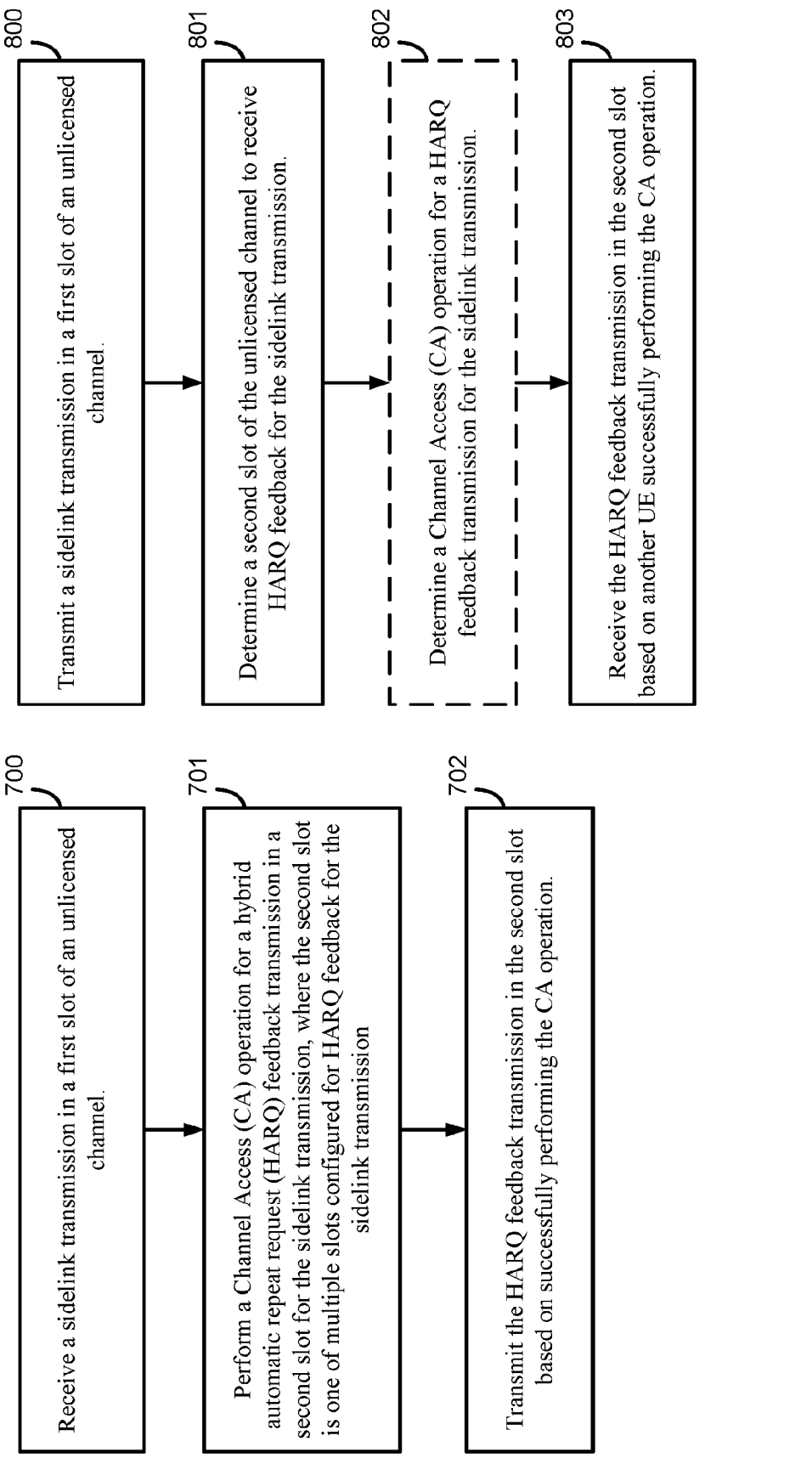

800 Transmit a sidelink transmission in a first slot of an unlicensed channel.

801 Determine a second slot of the unlicensed channel to receive HARQ feedback for the sidelink transmission.

802 Determine a Channel Access (CA) operation for a HARQ feedback transmission for the sidelink transmission.

803 Receive the HARQ feedback transmission in the second slot based on another UE successfully performing the CA operation.

*FIG. 8*

700 Receive a sidelink transmission in a first slot of an unlicensed channel.

701 Perform a Channel Access (CA) operation for a hybrid automatic repeat request (HARQ) feedback transmission in a second slot for the sidelink transmission, where the second slot is one of multiple slots configured for HARQ feedback for the sidelink transmission

702 Transmit the HARQ feedback transmission in the second slot based on successfully performing the CA operation.

*FIG. 7*

HARQ FEEDBACK TRANSMISSION FOR SIDELINK COMMUNICATION IN UNLICENSED SPECTRUM

CROSS-REFERENCE TO RELATED APPLICATIONS

This application claims the benefit of Greek Patent Application No. 20200100594, entitled, "HARQ FEEDBACK TRANSMISSION FOR SIDELINK COMMUNICATION IN UNLICENSED SPECTRUM," filed on Sep. 30, 2020, which is expressly incorporated by reference herein in its entirety.

TECHNICAL FIELD

Aspects of the present disclosure relate generally to wireless communication systems, and more particularly, to hybrid automatic repeat request (HARQ) operations. Certain embodiments of the technology discussed below may enable and provide HARQ operation enhancements for sidelink communications in shared or unlicensed spectrum.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a user equipment (UE), a sidelink transmission in a first slot of an unlicensed channel. The method also includes performing, by the UE, a Channel Access (CA) operation for a hybrid automatic repeat request (HARQ) feedback transmission in a second slot for the sidelink transmission, the second slot is one of multiple slots configured for HARQ feedback for the sidelink transmission. The method further includes transmitting, by the UE, the HARQ feedback transmission in the second slot based on successfully performing the CA operation.

In another aspect, a method of wireless communication includes transmitting, by a user equipment (UE), a sidelink transmission in a first slot of an unlicensed channel. The method also includes determining, by the UE, a second slot of the unlicensed channel to receive hybrid automatic repeat request (HARQ) feedback for the sidelink transmission, the second slot is one of multiple slots configured for HARQ feedback for the sidelink transmission. The method further includes receiving, by the UE, a HARQ feedback transmission for the sidelink transmission in the second slot based on another UE successfully performing a Channel Access (CA) operation.

In one aspect of the disclosure, a method of wireless communication includes receiving, by a user equipment (UE), a sidelink transmission in a first slot of an unlicensed channel. The method also includes determining, by the UE, a second slot of the unlicensed channel to transmit HARQ feedback for the sidelink transmission. The method includes determining, by the UE, a Channel Access (CA) operation for a HARQ feedback transmission for the sidelink transmission. The method further includes transmitting, by the UE, the HARQ feedback transmission in the second slot based on successfully performing the CA operation.

In an additional aspect of the disclosure, an apparatus configured for wireless communication is disclosed. The apparatus includes means for receiving, by a user equipment (UE), a sidelink transmission in a first slot of an unlicensed channel. The apparatus also includes means for determining, by the UE, a second slot of the unlicensed channel to transmit HARQ feedback for the sidelink transmission. The apparatus includes means for determining, by the UE, a Channel Access (CA) operation for a HARQ feedback transmission for the sidelink transmission. The apparatus further includes means for transmitting, by the UE, the HARQ feedback transmission in the second slot based on successfully performing the CA operation.

In an additional aspect of the disclosure, a non-transitory computer-readable medium having program code recorded thereon. The program code includes code to receive, by a user equipment (UE), a sidelink transmission in a first slot of an unlicensed channel. The program code also includes code to determine, by the UE, a second slot of the unlicensed channel to transmit HARQ feedback for the sidelink transmission. The program code includes code to determine, by the UE, a Channel Access (CA) operation for a HARQ feedback transmission for the sidelink transmission. The program code further includes code to transmit, by the UE, the HARQ feedback transmission in the second slot based on successfully performing the CA operation.

In an additional aspect of the disclosure, an apparatus configured for wireless communication is disclosed. The apparatus includes at least one processor, and a memory coupled to the processor. The processor is configured to receive, by a user equipment (UE), a sidelink transmission in a first slot of an unlicensed channel. The processor is also configured to determine, by the UE, a second slot of the unlicensed channel to transmit HARQ feedback for the sidelink transmission. The processor is configured to determine, by the UE, a Channel Access (CA) operation for a HARQ feedback transmission for the sidelink transmission. The processor is further configured to transmit, by the UE, the HARQ feedback transmission in the second slot based on successfully performing the CA operation.

In another aspect of the disclosure, a method of wireless communication includes transmitting, by a user equipment (UE), a sidelink transmission in a first slot of an unlicensed channel. The method also includes determining, by the UE, a second slot of the unlicensed channel to receive HARQ feedback for the sidelink transmission. The method includes determining, by the UE, a Channel Access (CA) operation for a HARQ feedback transmission for the sidelink transmission. The method further includes receiving, by the UE, the HARQ feedback transmission in the second slot based on another UE successfully performing the CA operation.

In an additional aspect of the disclosure, an apparatus configured for wireless communication is disclosed. The apparatus includes means for transmitting, by a user equipment (UE), a sidelink transmission in a first slot of an unlicensed channel. The apparatus also includes means for determining, by the UE, a second slot of the unlicensed channel to receive HARQ feedback for the sidelink transmission. The apparatus includes means for determining, by the UE, a Channel Access (CA) operation for a HARQ feedback transmission for the sidelink transmission. The apparatus further includes means for receiving, by the UE, the HARQ feedback transmission in the second slot based on another UE successfully performing the CA operation.

In an additional aspect of the disclosure, a non-transitory computer-readable medium having program code recorded thereon. The program code includes code to transmit, by a user equipment (UE), a sidelink transmission in a first slot of an unlicensed channel. The program code also includes code to determine, by the UE, a second slot of the unlicensed channel to receive HARQ feedback for the sidelink transmission. The program code includes code to determine, by the UE, a Channel Access (CA) operation for a HARQ feedback transmission for the sidelink transmission. The program code further includes code to receive, by the UE, the HARQ feedback transmission in the second slot based on another UE successfully performing the CA operation.

In an additional aspect of the disclosure, an apparatus configured for wireless communication is disclosed. The apparatus includes at least one processor, and a memory coupled to the processor. The processor is configured to transmit, by a user equipment (UE), a sidelink transmission in a first slot of an unlicensed channel. The processor is also configured to determine, by the UE, a second slot of the unlicensed channel to receive HARQ feedback for the sidelink transmission. The processor is configured to determine, by the UE, a Channel Access (CA) operation for a HARQ feedback transmission for the sidelink transmission. The processor is further configured to receive, by the UE, the HARQ feedback transmission in the second slot based on another UE successfully performing the CA operation.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3A-3D are diagrams illustrating hybrid automatic repeat request (HARQ) operations.

FIG. 7 is a flow diagram illustrating example blocks executed by a UE configured according to an aspect of the present disclosure.

FIG. 8 is a flow diagram illustrating example blocks executed by a UE configured according to another aspect of the present disclosure.

DETAILED DESCRIPTION

Figure 1:
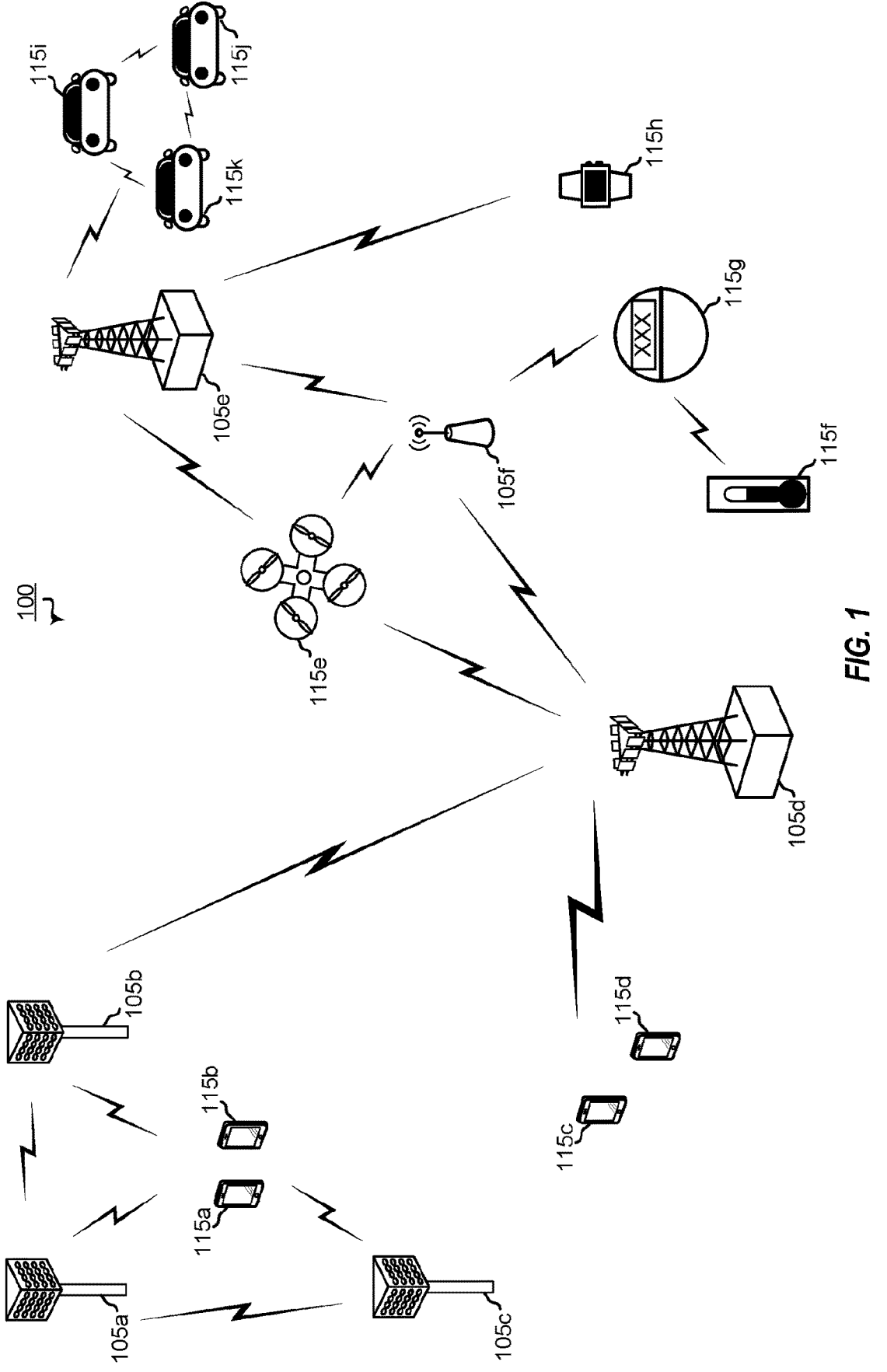
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
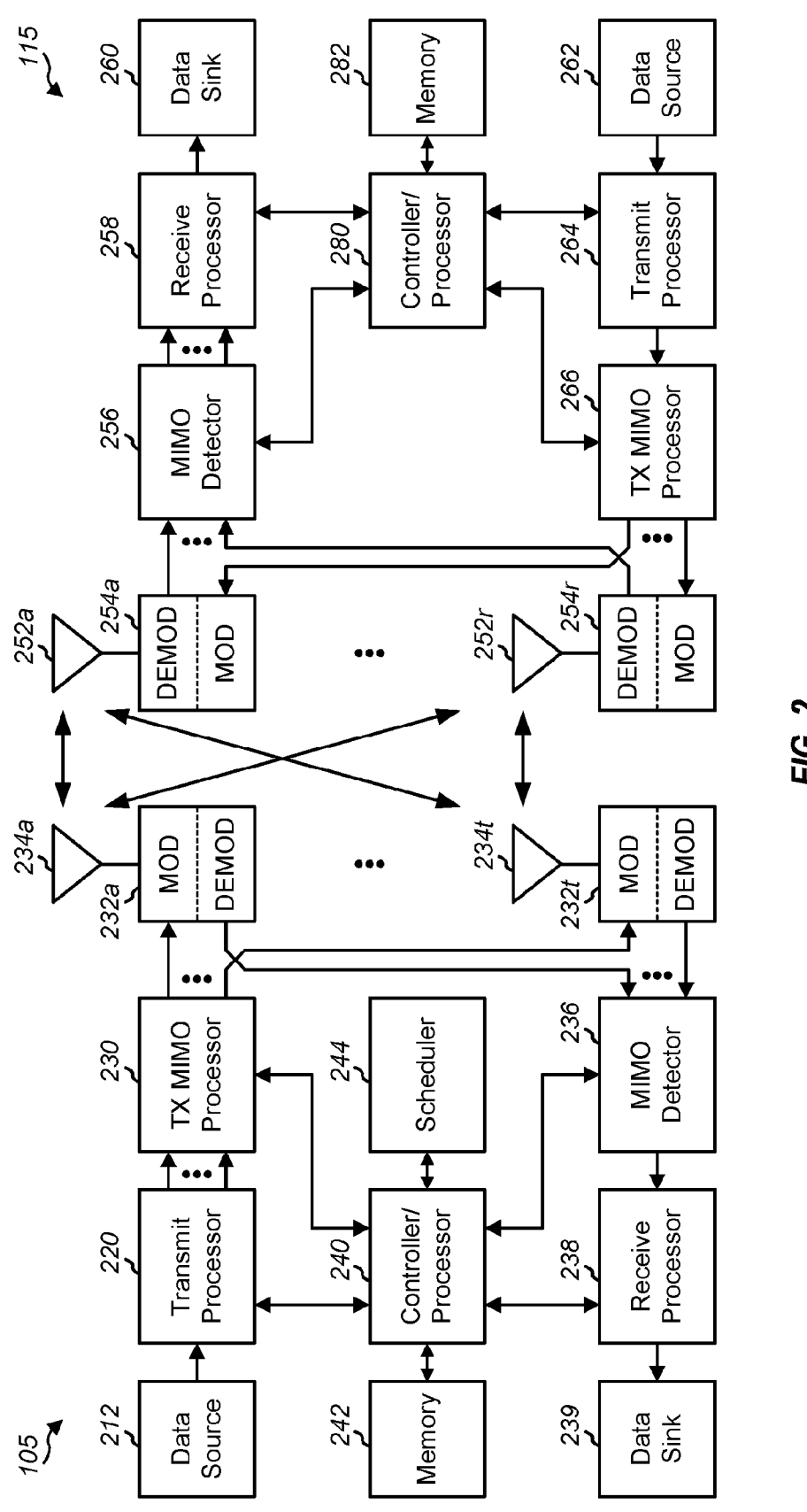
FIG. 2 is a block diagram conceptually illustrating a design of a base station and a UE configured according to some aspects.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 7 and 8, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own back-off window based on the amount of energy detected on a channel and/or the acknowledge/negative-acknowledge (ACK/NACK) feedback for its own transmitted packets as a proxy for collisions.

The aspects described herein are directed to enhanced hybrid automatic repeat request (HARQ) operations for communications in shared or unlicensed spectrum, such as in sidelink communication in unlicensed spectrum. Sidelink communications involve communications between UEs that may occur and/or be scheduled independent of a network (e.g., base station), for example, device-to-device communication (D2D), vehicle-to-vehicle communication (V2V), vehicle-to-infrastructure communication (V2I), vehicle-to-everything communication (V2X), etc. In such sidelink communications, devices may use spectrum which is shared by different networks or technologies. Devices may share such spectrum with the network, with other networks, or with other technologies. For example, V2X communication may share such spectrum with Wi-Fi networks in some implementations. Devices may perform CCA/LBT operations before transmitting to prevent multiple devices and/or networks from accessing the spectrum at the same time (e.g., prevent collisions and interference). Additionally, operation in unlicensed spectrum may have certain procedures or requirements, such as CCA and/or LBT procedures and requirements.

In some networks, receiving devices that are receiving data channel transmissions may provide feedback to transmitting devices to indicate if decoding of the transmission was successful or not. One example scheme of providing feedback is a HARQ feedback scheme.

The current NR V2X/sidelink design in 3GPP (Release-16/17) targets deployment in licensed spectrum, such as sharing a licensed cellular band, or in a dedicated spectrum for intelligent transportation system (ITS). It is contemplated herein that that cellular V2X communications could be deployed in unlicensed spectrum. For example, licensed spectrum and ITS spectrum for NR V2X may not be available or guaranteed in some regions. However, unlicensed spectrum may be shared by other technologies and/or types of networks (e.g., Wi-Fi), and access to the unlicensed spectrum may be subject to regulatory requirements. Thus, the currently proposed NR V2X/sidelink design (e.g., 3GPP Release-16/17) for licensed spectrum and ITS spectrum is not applicable for unlicensed spectrum.

For example, one of the requirements is LBT: a device has to perform sensing (listen) before it can transmit (talk). LBT is aka Channel Access in 3GPP. In LBT, device measures energy in the band and transmit if energy is below threshold. For example in 3GPP, a Type 2 channel access is an LBT operation without random back-off, where a transmitter device senses the channel for a fixed amount of duration before transmitting (aka Category 2 LBT), or transmits without channel sensing (aka Category 1 LBT); and a Type 1 channel access is a LBT operation with random back-off with a contention window of variable size (aka Category 4 LBT).

NR-U has adopted such channel access types and specified the following channel access operation types for Type 2 operations: Type 2A includes sensing duration of 25 us (aka CAT 2 LBT); Type 2B includes sensing duration of 16 us (aka CAT 2 LBT); and Type 2C does not include sensing (aka CAT 1 LBT and may be applied when the gap is no larger than 16 us). In NR-U, a gNB may initiate a COT (or CO, channel occupancy) based on Type 1 channel access. A UE may share the COT: the UE may perform Type 2 channel access before intended transmissions; the UE may transmit if the Type 2 channel access is successful.

To accommodate the additional procedures and requirements contemplated for NR V2X operation in sidelink, enhanced HARQ feedback transmission operations are disclosed herein. The described aspects may reduce LBT failure probability for HARQ feedback transmission and improve HARQ feedback transmission opportunities and performance. Accordingly, sidelink operation (e.g., V2X) can be enabled in unlicensed spectrum with guaranteed service quality and network performance.

The currently proposed NR V2X/sidelink HARQ feedback mechanism for licensed and ITS spectrum includes NACK-only feedback and ACK/NACK feedback. To illustrate, in ACK/NACK feedback, a first UE (UE1) transmits a data transmission via a data channel (e.g., a PSSCH). Second UEs (one or multiple UE2s) that have received the transmission may send ACK/NACK to indicate whether the data is successfully decoded. The HARQ feedback transmission (e.g., PSFCH transmission) happens in configured PSFCH resources. These resources may be preconfigured (e.g., set by the network or region), and these resources may occur in every N slots (N=0,1,2,4) following the slot where the data transmission was sent.

In conventional, licenses spectrum operations, the resource used for HARQ feedback transmission corresponding to a PSSCH is determined based on time, frequency location of the transmission, transmitter UE ID, and optionally receiver UE ID. Receiver UE ID may be used if HARQ feedback is for ACK/NACK based on group communications (e.g., groupcast transmissions). Each HARQ feedback is transmitted in one physical resource block (PRB) and two OFDM symbols in the PSFCH resource. There may be multiple PSFCH resources configured for a particular PSSCH transmission.

Conventional, licenses spectrum operations also support groupcast feedback. Multiple resources may be used for groupcast ACK/NACK feedback, so different receiver UEs in the group may transmit feedback in different PSFCH resources. It is possible that multiple transmit UEs transmit data in same resource (which results in a data collision). This data collision or collisions may also result in feedback collisions. Accordingly, the multiple HARQ resource mapping described herein may optionally be used with the above conventional, licenses spectrum operations and may alleviate some or all HARQ collisions.

HARQ feedback-based retransmission improves system performance. For example, retransmission(s) improve and/or guarantee delivery of a packet to intended receivers. Additionally, as compared to blind retransmission (a transmitter transmits a packet for a certain number of times), HARQ feedback-based retransmission improves spectral efficiency. However, for sidelink communications in unlicensed spectrum, HARQ feedback transmission may be subject to availability of the channel. For example, a transmitting UE may transmit a TB in slot n, and a receiving UE may not be able to transmit feedback until slot n+k, where k is the receiving UE's processing time. When k>=1, there may be a gap between data transmission and HARQ feedback transmission.

By regulation, the receiving UE is required to perform LBT before HARQ feedback transmission if the gap is larger than a threshold (when gap is larger than a threshold, UE cannot assume the medium is still idle or the transmissions are contiguous in time). In some implementations, a receiving UE may need to perform CAT 4 LBT (type 1 channel access) if the gap is larger than a threshold (e.g., 25 us). The uncertainty of the channel availability and time resource location for HARQ feedback caused by the CAT 4 LBT may largely compromise the system performance improvement from HARQ feedback.

The operations and techniques proposed herein enable HARQ feedback mechanisms to improve system performance. Specifically, the HARQ operations described herein improve the design to increase HARQ transmission opportunities (thus reduce LBT failure probability for HARQ feedback transmission), while still maintaining reasonable HARQ processing time.

In some aspects, a UE receiving on a sidelink channel, decodes the transmission and determines if HARQ feedback for the transmission is enabled/requested. The UE then determines a slot to transmit the HARQ feedback and a channel access type to transmit the HARQ feedback. The UE then performs channel access prior to HARQ feedback transmission in the determined slot, based on the determined channel access type; the UE transmits the HARQ feedback in the slot if channel access procedure is successful.

For the HARQ feedback slot determination, the UE may determine multiple HARQ feedback transmission opportunities, for example, multiple slots for the HARQ feedback transmission. Each HARQ transmission opportunity may correspond to a HARQ timeline of one or more HARQ timelines that are configured for HARQ feedback. Additionally, the UE may perform channel access to transmit in one or multiple of the HARQ feedback slots. For the channel access type determination, the channel access type may be (pre)configured, determined based on sidelink signal detection, indicated in control signaling of the sidelink transmission, or a combination thereof. Multiple HARQ transmission opportunities and/or certain channel access type decrease LBT failure probability and increase HARQ feedback transmission opportunities, thus improve the system performance.

FIGS. 3A-3D illustrate an example of HARQ feedback diagrams. In a first diagram 3A, an example slot format is illustrated for HARQ feedback operations in licensed spectrum. In the example of FIG. 3A, the slot includes 14 symbols and has a PSCCH portion, a PSSCH portion, and a PSFCH portion. The PSCCH portion may be part of or continuous with the PSSCH portion. The PSSCH portion and the PSFCH portion are separated by a gap. In the example of FIG. 3A, the gap is a one symbol gap. In other examples, the gap may be larger, smaller, or not present.

In the example of FIG. 3A, the slot include a second gap at a start of the slot and prior to the PSCCH and PSSCH portions. Additionally, in the example of FIG. 3A, the slot includes a third gap after the PSFCH portion. CCA/LBT Operations may be performed in one or more of the gaps.

During operation, a transmitting device may transmit a control transmission in resources of the PSCCH portion. For example, a transmitting UE may transmit a first PSCCH transmission in the second through fourth symbols after successfully performing a LBT operation for the first symbol. The transmitting device may then transmit a data transmission in resources of the PSSCH portion. For example, a transmitting UE may transmit a first PSSCH transmission in any of the second through tenth symbols after the control transmission and/or successfully performing the LBT operation for the first symbol. Another device (e.g., a receiving device) may transmit a HARQ feedback transmission in a resource of the PSFCH portion. For example, a receiving UE may transmit a first PSFCH transmission in the twelfth and thirteenth symbols after successfully performing a LBT operation for the eleventh symbol. To illustrate, the receiving UE may perform a full LBT operation, such as CAT 3 or CAT 4 operation. In the enhancements described herein, a receiving device may perform a partial or reduced LBT operation or no LBT operation based on settings and/or signaling from prior portions of the slot.

The HARQ feedback transmitted in the slot may not be for the data transmission in prior symbols of the slot. For example, cellular networks account for a processing delay for HARQ operations and such is illustrated by FIG. 3B. FIG. 3B depicts a HARQ feedback timeline for HARQ transmission which illustrates the feedback delay. FIG. 3B depicts 3 slots with optional intervening slots between the second and third slots. The three slots include a previous slot (slot n−1), a current slot (slot n), and one or more future slots (slot(s) n+k). Parameter k is the HARQ feedback timeline or timeframe number and represents a number of slots of delay for HARQ feedback. That is, transmissions in slot n will have resources in slot n+k for transmission of HARQ feedback. In the enhancements described herein, system or network may support multiple HARQ timelines. Such an additional timeline or timelines may enable additional HARQ resources for feedback transmissions, without increasing an amount of network resources for HARQ feedback transmission or without doubling the network resources for HARQ feedback.

FIG. 3C corresponds to a HARQ resource mapping diagram for licensed spectrum. In FIG. 3C, the left block diagram corresponds to a frequency time resource mapping where subchannels are illustrated vertically in columns and time/slots are illustrated horizontally. When the frequency time resources are mapped to physical resource blocks (PRBs), the resources map be mapped as shown in the right block diagram. For example, the PRBs of a first resource (resource 1) may be next to PRBs of a second resource (resource 2).

FIG. 3D corresponds to a HARQ resource timing diagram. HARQ feedback transmission (e.g., PSFCH) may be configured in every N slots, such as N=0, 1, 2, 4, etc. A value of zero may indicate no HARQ feedback. The timing diagram in FIG. 3D illustrates a HARQ scheme where HARQ feedback is transmitted in every fourth slot. That is feedback for the four previous slots illustrated in FIG. 3D, occurs in a later slot (n+3+k). That is HARQ feedback is transmitted for four previous slots after some delay from a last slot of the four slots (n+3).

Figure 4:
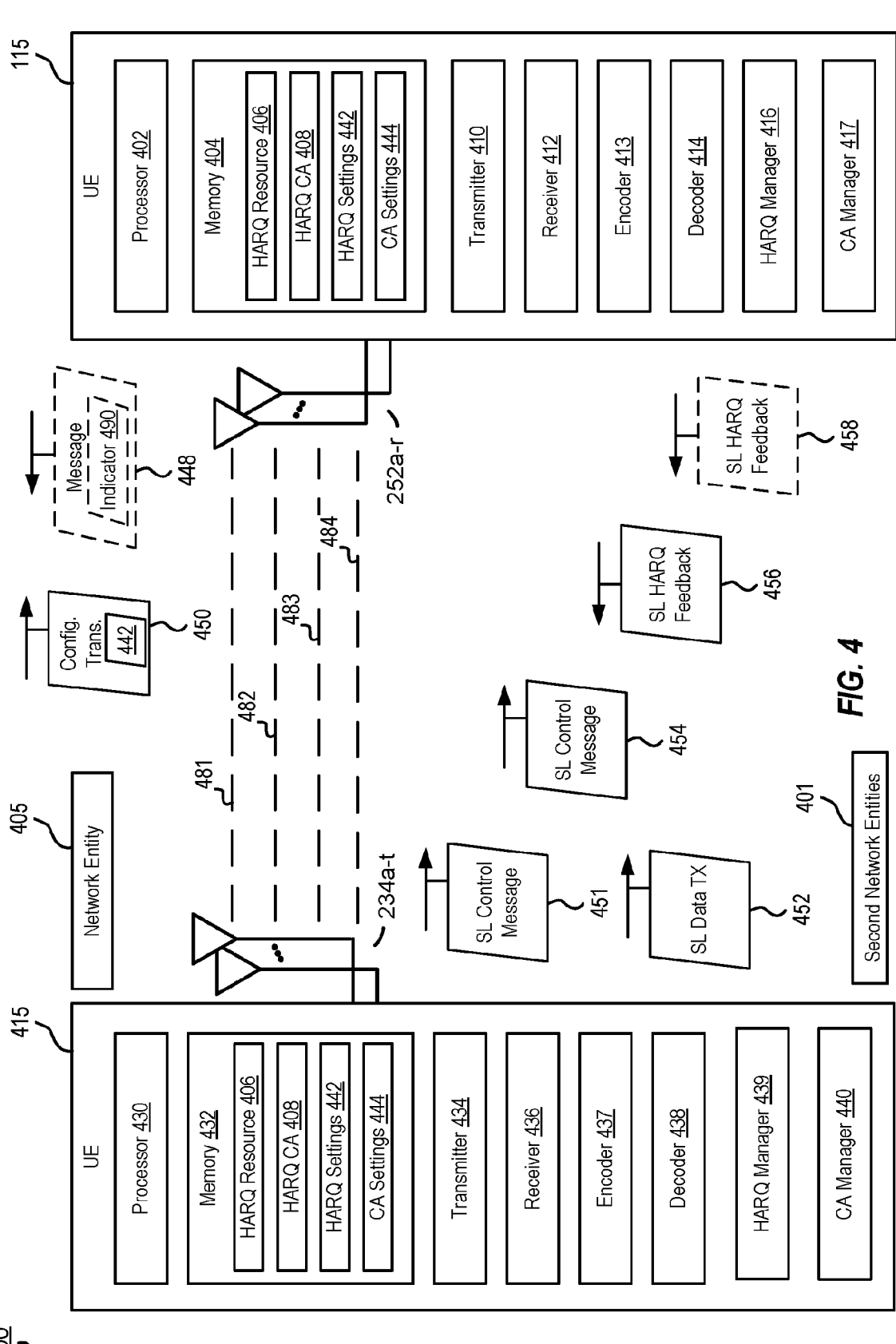
FIG. 4 is a block diagram illustrating an example of a wireless communications system (with a UE and base station) with hybrid automatic repeat request (HARQ) operations for sidelink channel communications.

FIG. 4 illustrates an example of a wireless communications system 400 that supports enhanced HARQ operations for sidelink communications in accordance with aspects of the present disclosure. In some examples, wireless communications system 400 may implement aspects of wireless communication system 100. For example, wireless communications system 400 may include UEs 115 and 415 and network entity 405. The wireless communications system 400 may optionally include second network entities 401, or may operate in same portion of the electromagnetic spectrum as the second network entities 401. In such implementations where the second network entities 401 are separate from the communications system 400, the second network entities 401 may be part of their own, separate communications system, such as a WiFi communications system. Enhanced HARQ operations for sidelink communications operations may reduce network overhead and latency and increase throughput. Thus, network and device performance can be increased.

UE 115 and 415 may be configured to communicate via frequency bands, such as FR1 having a frequency of 410 to 7125 MHz, FR2 having a frequency of 24250 to 52600 MHz for mm-Wave, and/or one or more other frequency bands. It is noted that SCS may be equal to 15, 30, 60, or 120 kHz for some data channels. UE 115 and 415 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via UE 115 and 415. For example, the control information may be communicated suing MAC-CE transmissions, RRC transmissions, SCI (sidelink control information), transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, HARQ manager 416, Channel Access (CA) manager 417, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store HARQ resource data 406, HARQ CA data 408, HARQ settings data 442, CA settings data 444, or a combination thereof, as further described herein.

The HARQ resource data 406 includes or corresponds to data associated with or corresponding to resources used for HARQ feedback transmissions. For example, the HARQ resource data 406 may indicate candidate resources (e.g., available resources) for a HARQ feedback transmission. The HARQ resource data 406 may also include thresholds or data used to evaluate whether to send one or multiple HARQ feedback transmissions, such as conditions for determining whether to send multiple feedback transmissions and/or for selecting transmission resources from the candidate resources.

The HARQ CA data 408 includes or corresponds to data indicating or corresponding to a CA operation type for HARQ feedback transmissions. For example, the HARQ CA data 408 may include data indicating a particular CA operation type for one or more HARQ feedback transmissions. The HARQ CA data 408 may also include parameters or settings for determining and/or selecting or prioritizing CA operation types. For example, the HARQ CA data 408 may include network configured or pre-configured settings for CA operation type determination.

The HARQ settings data 442 includes or corresponds to data associated with enhanced HARQ feedback operations for sidelink communications. The HARQ settings data 442 may include one or more types of HARQ feedback operation modes and/or thresholds or conditions for switching between HARQ feedback modes and/or configurations. For example, the HARQ settings data 442 may have data indicating different thresholds for different HARQ feedback modes, such as single or multiple HARQ timeline modes and/or FBE and non-FBE modes.

The CA settings data 444 includes or corresponds to data associated with enhanced CA operation determination operations for HARQ feedback. The CA settings data 444 may include one or more types of CA operation modes and/or thresholds or conditions for switching between CA operation modes and/or configurations. For example, the CA settings data 444 may have data indicating different thresholds for different CA operation modes, such as NW signaled or gap based CA operation determination modes.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. HARQ manager 416 may be configured to determine and perform HARQ feedback operations. For example, HARQ manager 416 is configured to determine what resource or resources to use for HARQ feedback, such as when and where to perform feedback transmission. As another example, HARQ manager 416 is configured to determine whether to perform one feedback transmission or multiple feedback transmissions, such as first and second feedback transmissions. In some implementations, the HARQ manager 416 is configured to determine when to drop the feedback transmission or engage in discontinuous transmission (DTX) of HARQ feedback.

CA manager 417 may be configured to determine and perform CA operations for HARQ feedback transmission. For example, CA manager 417 may be configured to determine whether to perform any CA operations for transmission of HARQ feedback. In implementations, where a CA operation is to be performed, the CA manager 417 may be configured to determine what type of CA operation to perform. For example, the CA manager 417 may determine a type of CA operation based on UE settings, NW indication, network or region configurations, sidelink signal detection, sidelink data channel transmission, or a combination thereof. To illustrate, the CA manager 417 may determine a CA operation based on a decoded SCI or a gap size. The CA manager 417 may be further configured to perform the CA operation for HARQ feedback transmission.

UE 415 includes processor 430, memory 432, transmitter 434, receiver 436, encoder 437, decoder 438, HARQ manager 439, CA manager 440, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store HARQ resource data 406, HARQ CA data 408, HARQ settings data 442, CA settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, UE 415 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of UE 415 described with reference to FIG. 2.

Encoder 437, and decoder 438 may include the same functionality as described with reference to encoder 413 and decoder 414, respectively. HARQ manager 439 may include similar functionality as described with reference to HARQ manager 416. CA manager 440 may include similar functionality as described with reference to CA manager 417.

During operation of wireless communications system 400, UE 415 may determine that UE 115 has enhanced HARQ feedback operation capability. For example, UE 115 may transmit a message 448 that includes an enhanced resource reservation indicator 490 (e.g., a HARQ feedback for sidelink channel indicator). Indicator 490 may indicate enhanced HARQ feedback operation capability for unlicensed spectrum and/or sidelink channel operations or a particular type or mode of HARQ feedback operation. In some implementations, a network entity (e.g., a network entity 405) or UE 415 sends control information to indicate to UE 115 that enhanced HARQ feedback operation and/or a particular type of enhanced HARQ feedback operation is to be used. For example, in some implementations, message 448 (or another message, such as configuration transmission 450) is transmitted by the UE 415 or the network entity 405. The configuration transmission 450 may include or indicate to use enhanced HARQ feedback operations or to adjust or implement a setting of a particular type of enhanced HARQ feedback operation. For example, the configuration transmission 450 may include 442, as indicated in the example of FIG. 4, 444, or both.

During operation, devices of wireless communications system 400, perform enhanced HARQ feedback operations. For example, the UEs 115 and 415 exchange transmissions via a sidelink channel. In the example of FIG. 4, the UE 415 transmits a sidelink channel control message 451 to the UE 115. The sidelink channel control message 451 may include or indicate a particular resource selected by the UE 415 for a data channel transmission. To illustrate, the UE 415 may send a SCI message indicating a sidelink channel data transmission, such as a sidelink channel data transmission 452.

The UE 115 may receive the sidelink channel control message 451 and may determine the particular resource reserved by the UE 415. The UE 415 may then transmit data based on the sidelink channel control message 451. For example, the UE 415 may transmit a sidelink channel data transmission 452. The sidelink channel data transmission 452 may be transmitted in the same slot as the sidelink channel control message 451.

The UEs 115 and 415 may determine resources for HARQ feedback transmission or transmissions based on the sidelink channel data transmission 452 and optionally settings information, such as HARQ settings data 442. For example, the UE 115 may receive the sidelink channel data transmission 452 and may determine the resources for HARQ feedback transmission based on one or more HARQ timelines. The UE 115 may then transmit one or more feedback transmissions in the one or more determined resources, each HARQ transmission opportunity corresponding to a HARQ timeline of the one or more HARQ timelines.

After determining the resources for HARQ feedback transmission or transmissions, the UE 115 determines a channel access operation for each HARQ feedback transmission and determines whether to transmit the HARQ feedback transmission based on successfully performing the channel access operation. If the UE 115 does not successfully perform the determined channel access operation, the UE 115 does not transmit the HARQ feedback transmission in that particular resource. The UE 115 may determine different channel access operations for each HARQ feedback transmission in some implementations.

The UE 115 may determine a type of a channel access operation for a particular resource of the one or more determined resources based on decoding a transmission in a resource prior to the particular resource for HARQ feedback transmission. For example, the UE 115 may be configured to use a full or more robust channel access operation (e.g., Type 1 CA operation), and may be further configured to use a reduced or more limited channel access operation (e.g., Type 2 CA operation) when the network has secured the particular slot (and/or the previous slot and particular slot are part of the same COT). As another example, the UE 115 may be configured to use more robust channel access operation (e.g., Type 2A or 2B CA operation), and may be further configured to use a reduced or more limited channel access operation (e.g., Type 2C CA operation) when the network has secured the particular slot (and/or the previous slot and particular slot are part of the same COT). In both examples, the UE 115 may be able to use a reduced or more limited channel access operation in the slot based on the slot being occupied by sidelink channel communications.

In a particular implementation, the UE 115 may determine a channel access operation for a particular resource of the one or more determined resources based on a sidelink channel control message, such as a sidelink channel control message 454. For example, a UE (e.g., UE 115, UE 415, or another UE) may transmit the sidelink channel control message 454 in a slot subsequent to a slot of the sidelink channel data transmission 452. The UE 115 may then transmit a sidelink channel HARQ feedback transmission in the same slot as the sidelink channel control message 454. To illustrate, the UE 115 may transmit a first sidelink channel HARQ feedback transmission 456 in the same slot (e.g., prior resources) as the sidelink channel control message 454 based on a device of the network securing the slot (and COT) by sending of the sidelink channel control message 454.

In some implementations, the UE 115 may transmit a second sidelink channel HARQ feedback transmission 458. For example, the UE 115 may transmit the second sidelink channel HARQ feedback transmission 458 based on failing to transmit the first sidelink channel HARQ feedback transmission 456 due to a collision. As another example, the UE 115 may transmit the second sidelink channel HARQ feedback transmission 458 after successfully transmitting the first sidelink channel HARQ feedback transmission 456 in response to successfully performing a CA operation.

Additionally, UEs 115 and 415 may determine a CA operation or operations for the HARQ feedback transmission or transmissions based on a control message and optionally settings information, such as HARQ CA settings data 444. For example, the UE 115 may determine a particular CA operation for the first sidelink channel HARQ feedback transmission 456 based on the sidelink channel control message 454. In some implementations, receiving of the sidelink channel control message 454 may indicate that the network has secured the slot and COT. In other implementations, the sidelink channel control message 454 includes an indication of the particular CA operation. Alternatively, CA settings data 444 may specify the CA operation or conditions for different CA operations, such as for different HARQ operations. In some such implementations, the CA operation may be determined independent of the sidelink channel control message 454. CA determination details are described further with reference to FIG. 6.

Accordingly, the UEs 115 and 415 may be able to more efficiently perform HARQ feedback operations. Thus, FIG. 4 describes enhanced HARQ feedback operations. Using enhanced HARQ feedback operations may enable improvements when operating in shared spectrum. Performing enhanced HARQ feedback enables reduced bandwidth/spectrum waste when performing contention operations and thus, enhanced UE and network performance by increasing throughput and reducing latency.

Figure 5:
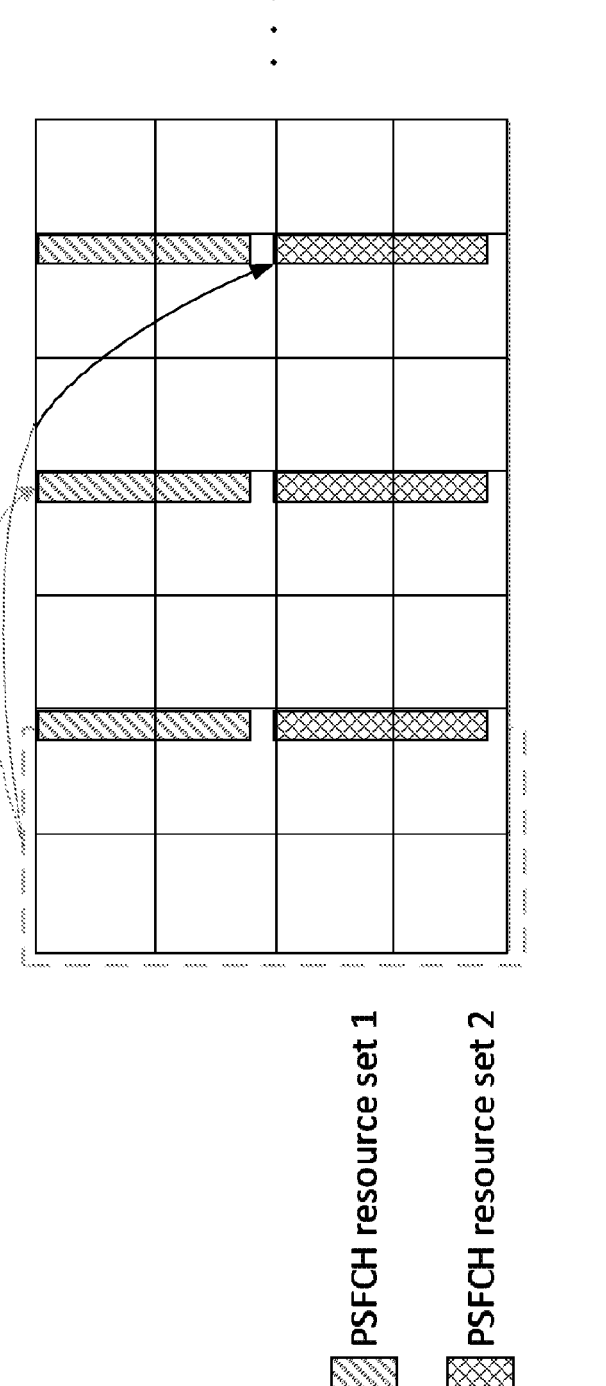
FIG. 5 is a diagram illustrating an example of HARQ resource determination operations according to some embodiments of the present disclosure.

FIG. 5 is a diagram illustrating an example of multiple resource set HARQ feedback operations. In FIG. 5, a diagram illustrating two resource sets for HARQ feedback are illustrated. Specifically, two resource sets are depicted with three resources each. Each of the resource sets may have different HARQ settings. For example, each resource set may have different HARQ timelines (e.g., different HARQ delays or HARQ feedback time gaps). In the example of FIG. 5, the first resource set has a HARQ delay of two and the second resource set has a HARQ delay of four. In other implementations, each resource set may have similar or the same HARQ settings, such as the same HARQ timeline (i.e., a single HARQ timeline).

FIG. 5 illustrates two PSFCH resource sets which are FDM'ed. Each resource set may have multiple HARQ feedback resources; the UE determines a resource set based on the HARQ timeline, then determines one feedback resource within the set. The UE transmits HARQ feedback in the determined resource if a channel access operation is successful. In other implementations, each resource set may be TDM'ed (i.e., in different slots/OFDM symbols). The determination of one feedback resource within the set may be the same as or similar to NR Rel-16 sidelink HARQ feedback resource determination; for example, the HARQ feedback resource may be determined based on the data channel time and/or one or more of the frequency resource index, the data transmitter UE ID, or the UE member ID.

In some implementations with multiple HARQ timelines, the HARQ timelines may be semi-statically configured (e.g., RRC configured) or preconfigured/specified for sidelink operations. When multiple HARQ timelines are used, the UE determines slots for HARQ feedback transmission based on each of the timelines. For example, the UE determines one PSFCH slot for each timeline. Thus, for M HARQ timelines, the UE determines M PSFCH slots for HARQ feedback transmissions.

As described with reference to FIG. 4, the UE may attempt to transmit in one or more of the determined resources. Additionally, the UE may perform channel access operations to transmit HARQ feedback in one or multiple of the determined PSFCH slots. In implementations where the UE is configured to only transmit a HARQ feedback once, the UE may prioritize earlier resources. For example, the UE performs a channel access operation to transmit the HARQ feedback in the first determined PSFCH slot. If the channel access operation is successful, the UE transmits the HARQ feedback in the first determined PSFCH slot. The UE then ceases attempting to transmit the HARQ feedback in any remaining slots. If the channel access operation is not successful, the UE determines a subsequent resource to attempt to transmit the HARQ feedback. For example, the UE performs a second channel access operation to transmit the HARQ feedback in the next determined PSFCH slot.

In implementations where the UE is configured to transmit a HARQ feedback multiple times, the UE may attempt to transmit in each resource or in a set number of resources (e.g., 2, 3, 4, etc.). For example, the UE performs a channel access operation in each determined PSFCH slot to attempt to transmit HARQ feedback in all the determined PSFCH slots. In a particular implementation, the UE performs different channel access operations in one or more of the slots. It is possible that the UE may transmit the same HARQ feedback in more than one PSFCH slot (depending on whether channel access is successful). Additionally, it is also possible that the UE may fail the channel access operation in all of the determined HARQ slots. In such implementations, the UE may drop the HARQ feedback or engage in discontinuous transmission of the HARQ feedback.

Although multiple resource sets for multiple timelines are illustrated in FIG. 5, in other implementations, a single resource set may be used for HARQ feedback transmission. Even when a single resource set is used, the HARQ feedback settings may still include multiple HARQ timelines.

In one example, there are M HARQ timelines specified or configured; HARQ feedback resources within a HARQ feedback slot are indexed as 0, 1, 2, . . . , N_PSFCH-1. The N_PSFCH HARQ resources are grouped into M groups (e.g., based on the HARQ resource indices); each group of HARQ resources corresponds to a HARQ feedback timeline. The UE first determines a resource group based on the timeline; then determines a resource from the group of resource (e.g., based on the data channel time and frequency resource index, and/or, TX UE ID, and/or, RX UE member ID). For example, when two HARQ timelines are specified, HARQ resources with even indices are used for HARQ transmission with timeline k1, HARQ resources with odd indices are used for HARQ transmission with timeline k2.

In another example, there are M HARQ timelines specified or configured. The UE first determines a subset of HARQ feedback resources $$\left(N^{(1)}_{PSFCH}\right)$$

in the HARQ feedback resource set (e.g., similar to NR Rel-16 sidelink HARQ feedback resource determination, based on PSSCH time and frequency resource index). The UE then determines a HARQ feedback resource from the subset of HARQ feedback resources, based on TX UE ID $P_{ID}$) ($P_{ID}$), RX UE member ID ($M_{ID}$), and the index HARQ timeline used for the HARQ feedback transmission (m,m=0, 1, . . . , M−1). For example, for a HARQ feedback transmission with timeline index m, the HARQ feedback resource determined from the subset of HARQ feedback resources is $$(P_{ID} + M_{ID} + m)\mathrm{mod}N^{(1)}_{PSFCH}(\mathrm{mod: modulo\ operator}).$$

Figure 6:
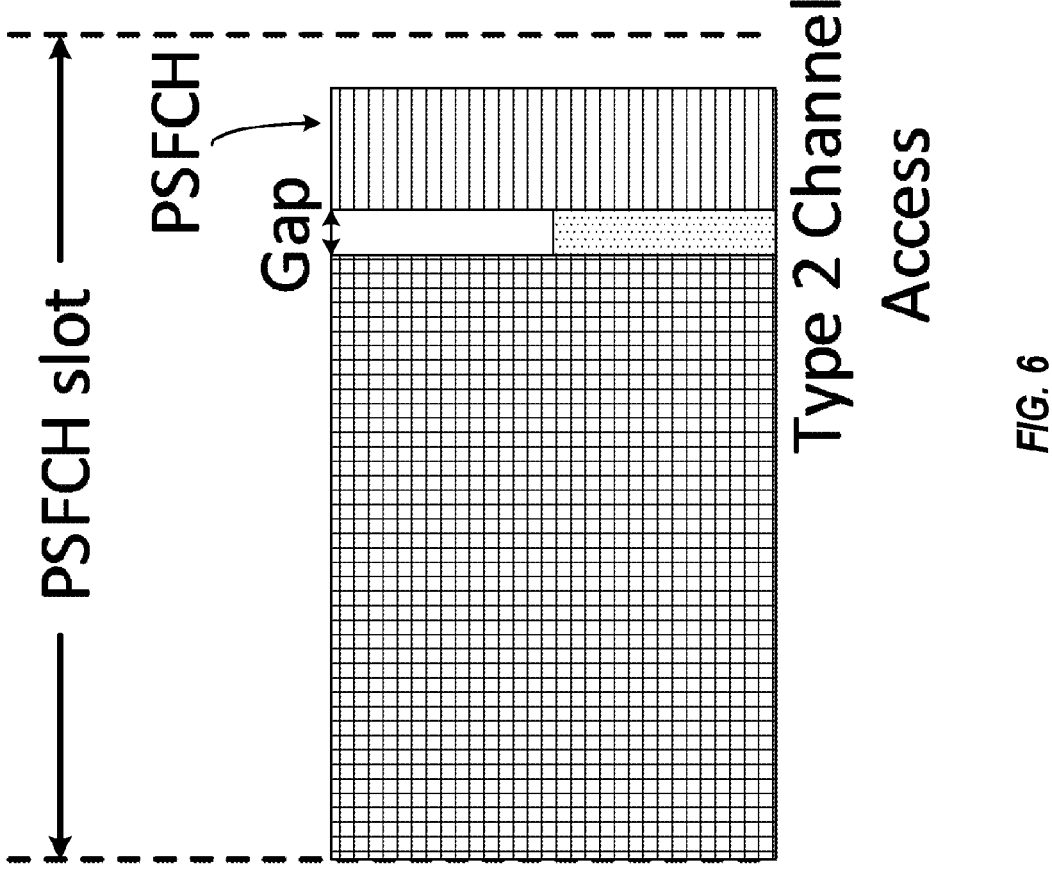
FIG. 6 is a diagram illustrating an example of channel access (CA) operation selection for HARQ feedback according to some embodiments of the present disclosure.

FIG. 6 is a diagram illustrating an example slot layout for sidelink operations. In FIG. 6, a PSFCH slot layout is illustrated. Specifically, a slot for PSFCH HARQ feedback is illustrated which includes a first portion for control and/or data transmission and a second portion for feedback transmissions; a gap without sidelink signal transmission may be between the two portions. As illustrated in FIG. 6, a CA operation for HARQ feedback transmission may be performed prior the feedback transmission, e.g., in the gap between the two portions. In the example of FIG. 6, a LBT CAT 2 operation is performed. In other implementations, other CA (e.g., LBT) operations may be performed.

The particular CA operation may be set by the network, determined by the receiving device, indicated by the transmitting device, or a combination thereof. For example, when set by the network, the CA operation may be semi-statically set by the network (e.g., base station). To illustrate, a base station may transmit a RRC message to perform type 2A or 2B CA operations, as illustrative examples. In some such implementations, the RRC message may indicate conditions for the use of such 2A or 2B operations, such as if a gap of the slot satisfies a gap threshold condition. As another example, the CA operation or CA operation determination conditions may be preset by the network or region.

When the CA operation is determined by a receiving device, the CA operation may be determined based on or at least partially on a received transmission. For example, receiving a sidelink control or data transmission in the slot may indicate that the slot is secured by the network, such as the sidelink (e.g., V2X) network, as opposed to another network which is sharing the spectrum, such as WiFi. To illustrate, the UE may determine to perform a reduced CA operation based on the network securing the slot (or COT). As an illustrative example, a Type 2 (e.g., a 2A, 2B or 2C) is used by the UE to perform channel access for the HARQ feedback transmission if the UE has decoded a sidelink transmission in the same slot (e.g., the receive UE decodes SCI in the data portion of the HARQ feedback slot; the SCI may be transmitted by the same UE which transmitted the previous data for which feedback is being provided or a different UE); the UE may then determine to use Type 2 channel access for HARQ feedback transmission. Otherwise, the UE may use Type 1 channel access for HARQ feedback transmission. As another illustration, the UE may determine to transmit feedback in the slot based on the network not securing the slot, and the UE may perform a full CA operation.

Additionally or alternatively, the CA operation may be determined based on or at least partially on transmitting a sidelink transmission. For example, transmitting a sidelink control or data transmission in the slot may indicate that the slot is secured by the network, such as the sidelink (e.g., V2X) network (or specifically the UE), as opposed to another network which is sharing the spectrum, such as WiFi, or another UE. To illustrate, the UE may determine to perform a reduced CA operation based on the UE transmitting in the slot (or COT). As an illustrative example, a Type 2 (e.g., a 2A, 2B or 2C) is used by the UE to perform channel access for the HARQ feedback transmission if the UE has transmitted a sidelink transmission in the same slot (e.g., the receive UE transmits a control and data channel in the data portion of the HARQ feedback slot; the UE may then determine to use Type 2 channel access for HARQ feedback transmission. Otherwise, the UE may use Type 1 channel access for HARQ feedback transmission.

When the CA operation is indicated by the transmitting device, the CA operation may be signaled by a control transmission (e.g., SCI), in the slot or in a slot prior to it. For example, the control transmission associated with transmission for which feedback is being provided may indicate the CA operation or the control transmission in the slot may indicate the CA operation. In some implementations, the SCI may include a CA operation indicator. The CA operation indicator may indicate the CA operation to be used or may indicate a conditional CA operation to be used. When a conditional operation is indicated, the receiving UE may further determine to use the conditional CA operation or a default CA operation based on one or more additional conditions or thresholds. To illustrate, a UE may determine to use a type 2 CA operation based on decoding a SCI in the slot, and may determine to use a particular type of CA 2 operation based on the SCI in the slot or the SCI in the previous slot where the transmission was sent.

Additionally, or alternatively, one or more operations of FIGS. 4-6 may be added, removed, substituted in other implementations. For example, in some implementations, the example steps of FIGS. 5 and 6 may be used together. To illustrate, the resource determination operations of FIG. 5 may be used with the CA determination operations of FIG. 6. As another example, some of the steps of FIG. 4 may be used with any of FIGS. 5 and 6.

Figure 9:
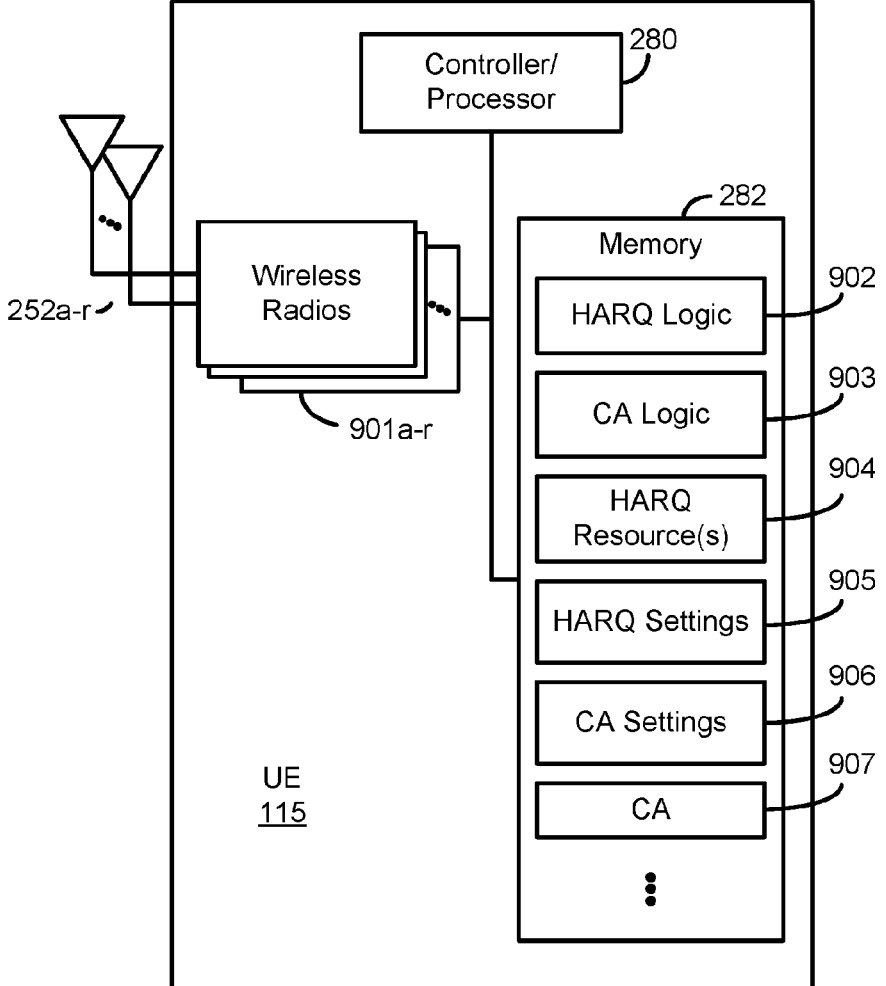
FIG. 9 is a block diagram conceptually illustrating a design of a UE configured to perform precoding information update operations according to some embodiments of the present disclosure.

FIG. 7 is a flow diagram illustrating example blocks executed by a UE configured according to an aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 901a-r and antennas 252a-r. Wireless radios 901a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 9, memory 282 stores HARQ logic 902, CA logic 903, HARQ resource data 904, HARQ settings data 905, CA settings data 906, and CA data 907.

At block 700, a wireless communication device, such as a UE, receives a sidelink transmission in a first slot of an unlicensed channel. For example, the UE 115 is operating in a sidelink communication mode and receives a sidelink transmission, as described with reference to FIGS. 4-6. The sidelink transmission may include or correspond to a PSCCH transmission and/or a PSSCH transmission from another UE.

At block 701, the UE 115 performs a Channel Access (CA) operation for a hybrid automatic repeat request (HARQ) feedback transmission in a second slot for the sidelink transmission. The second slot is one of multiple slots configured for HARQ feedback for the sidelink transmission. For example, the UE 115 performs a particular type of CA operation for HARQ feedback for the sidelink transmission. Performing the CA operation may include determining which slot to transmit the HARQ feedback and may include determining which type of CA procedure to perform for the slot and HARQ feedback.

In a particular implementation, the UE 115 determines a second slot of the unlicensed channel to transmit HARQ feedback for the sidelink transmission. For example, the UE 115 determines a second slot of the unlicensed channel to transmit HARQ feedback for the sidelink transmission, as described with reference to FIGS. 4-6. To illustrate, the UE 115 may determine two resources (e.g., slots) based on two HARQ timelines which are configured for the UE 115 and/or the sidelink transmission. The UE 115 may select an earliest resource of the two resources.

Additionally, or alternatively, the UE 115 determines a CA operation for a HARQ feedback transmission for the sidelink transmission. For example, the UE 115 determines a particular CA operation for a HARQ feedback transmission for the sidelink transmission, as described with reference to FIGS. 4-6. To illustrate, the UE 115 may determine a particular CA operation based on a received sidelink communication. In a particular example, the sidelink communication includes an indicator which indicates the particular CA operation or enables determination of the particular CA operation. In another example, the act of receiving or transmitting a sidelink communication in the second slot of the unlicensed channel indicates that the second slot is occupied by the sidelink communication channel and the UE 115 can use a particular or reduced CA operation.

At block 702, the UE 115 transmits the HARQ feedback transmission in the second slot based on successfully performing the CA operation. For example, the UE 115 the HARQ feedback transmission in the second slot based on successfully performing the CA operation, as described with reference to FIGS. 4-6. Based on configurations, the UE 115 may attempt to transmit one or more HARQ feedback transmissions in some implementations.

The UE 115 may execute additional blocks (or the UE 115 may be configured further perform additional operations) in other implementations. For example, the UE 115 may perform one or more operations described above. As another example, the UE 115 may perform one or more aspects as presented below.

In a first aspect, the UE is configured with multiple HARQ feedback resources for transmission of the HARQ feedback, wherein the second slot includes at least one HARQ feedback resource of the multiple HARQ feedback resources for the HARQ feedback.

In a second aspect, alone or in combination with the first aspect, each of the HARQ feedback resources is configured with a HARQ feedback time gap, wherein the second slot is determined based at least on a first HARQ feedback time gap of the multiple HARQ feedback time gaps.

In a third aspect, alone or in combination with one or more of the above aspects, the UE is configured with multiple HARQ feedback resource sets for the HARQ feedback in the unlicensed channel, wherein each of the HARQ feedback resource sets has an associated HARQ feedback time gap, wherein the second slot comprises HARQ feedback resource in a first resource set of the multiple resource sets.

In a fourth aspect, alone or in combination with one or more of the above aspects, the UE is configured with multiple HARQ feedback time gaps for sidelink communication (e.g., the sidelink transmission) in the unlicensed channel, wherein the second slot is determined based at least on a first HARQ feedback time gap of the multiple HARQ feedback time gaps.

In a fifth aspect, alone or in combination with one or more of the above aspects, determining the second slot to transmit the HARQ feedback for the transmission includes: determining, by the UE, a plurality of slots to transmit the HARQ feedback for the sidelink transmission, wherein the second slot is a particular slot of the plurality of slots.

In a sixth aspect, alone or in combination with one or more of the above aspects, the UE refrains the HARQ feedback in a third slot of the plurality of slots based on successfully transmitting the HARQ feedback in the second slot; wherein the third slot is a subsequent slot of the second slot.

In a seventh aspect, alone or in combination with one or more of the above aspects, the UE determines a third slot of the plurality of slots to transmit the HARQ feedback for the transmission; determines a second CA operation for the HARQ feedback in the third determined slot; and refrains from transmitting a second HARQ feedback transmission in the third determined slot based on not successfully performing the second CA operation.

In an eighth aspect, alone or in combination with one or more of the above aspects, the UE 115 transmits a second HARQ feedback transmission in a third determined slot of the plurality of slots based on successfully performing a second CA operation, the second HARQ feedback transmission corresponds to a sidelink channel transmission in the unlicensed channel.

In a ninth aspect, alone or in combination with one or more of the above aspects, determining the CA operation for the HARQ feedback in the determined slot includes: determining, by the UE, the CA operation for the HARQ feedback based on UE configuration settings.

In a tenth aspect, alone or in combination with one or more of the above aspects, the UE 115 receives a RRC message indicating the UE configuration settings.

In an eleventh aspect, alone or in combination with one or more of the above aspects, determining the CA operation for the HARQ feedback in the determined slot includes: determining, by the UE, the CA operation for the HARQ feedback based on receiving a sidelink communication prior to the HARQ feedback transmission.

In a twelfth aspect, alone or in combination with one or more of the above aspects, the sidelink communication is transmitted in a sidelink shared channel resource of the second slot, which precedes the HARQ feedback resource in the second slot.

In a thirteenth aspect, alone or in combination with one or more of the above aspects, determining the CA operation for the HARQ feedback in the determined slot further includes: determining, by the UE, the CA operation for the HARQ feedback further based on UE configuration settings, a gap configuration of the slot (e.g., gap configuration settings), or both.

In a fourteenth aspect, alone or in combination with one or more of the above aspects, determining the CA operation for the HARQ feedback in the determined slot includes: determining to use a simplified CA operation for the HARQ feedback transmission based on receiving or transmitting a sidelink communication prior to the HARQ feedback transmission, the simplified CA operation includes a CA operation without random back-off, a CA operation without energy detection, or both.

In a fifteenth aspect, alone or in combination with one or more of the above aspects, in determining the CA operation for the HARQ feedback in the determined slot includes: determining, by the UE, the CA operation for the HARQ feedback based on a received sidelink control message (e.g., based on an indication of the sidelink control message).

In a sixteenth aspect, alone or in combination with one or more of the above aspects, the sidelink control message is a SCI, and wherein the SCI indicates a category or a type of the CA operation (e.g., includes a CA indicator).

In a seventeenth aspect, alone or in combination with one or more of the above aspects, determining, by the UE, the type of the CA operation for the HARQ feedback further based on UE settings, a gap configuration, or both.

In an eighteenth aspect, alone or in combination with one or more of the above aspects, determining the second slot to transmit HARQ feedback for the sidelink transmission, comprises: determining a frame period for HARQ feedback transmission, wherein the frame period is the same as a HARQ feedback resource period, and wherein the second slot of the unlicensed channel is an initial slot of the frame period.

In a nineteenth aspect, alone or in combination with one or more of the above aspects, the UE is configured with a number of transmission settings for HARQ feedback.

In a twentieth aspect, alone or in combination with one or more of the above aspects, the CA operation includes a type 1 operation or a type 2 operation, wherein a type 1 operation includes a CA operation with a random back-off, a variable size contention window, or both. and wherein a type 2 operation includes a CA operation without a random back-off.

In a twenty-first aspect, alone or in combination with one or more of the above aspects, the type 2 operation includes a CA operation without energy detection (e.g., a LBT CAT 1 operation), a CA operation with an energy detection in a sensing duration of 16 microseconds (μs) (e.g., a LBT CAT 2 operation), or a CA operation with an energy detection in a sensing duration of 25 μs (e.g., a LBT CAT 2 operation).

In a twenty-second aspect, alone or in combination with one or more of the above aspects, first slot and the second slot are in the same channel occupancy.

In a twenty-third aspect, alone or in combination with one or more of the above aspects, the second slot is determined based at least on the first HARQ feedback time gap of the multiple HARQ feedback time gaps, and the UE 115 determines a HARQ feedback resource in the second slot based at least on the first HARQ feedback time gap.

In a twenty-fourth aspect, alone or in combination with one or more of the above aspects, determining the CA operation for the HARQ feedback in the determined slot includes: determining, by the UE, the CA operation for the HARQ feedback based on transmitting a sidelink communication prior to the HARQ feedback transmission, wherein the sidelink communication is transmitted in a sidelink shared channel resource of the second slot, which precedes the HARQ feedback resource in the second slot.

Accordingly, a UE and a base station may perform enhanced HARQ operations. By performing HARQ operations, throughput and reliability may be increased and such operations may enable increased spectrum sharing for sidelink operations with reduced capability (e.g., less advanced) devices.

FIG. 8 is a flow diagram illustrating example blocks executed by a UE configured according to another aspect of the present disclosure. The example blocks will also be described with respect to UE 115 as illustrated in FIG. 9.

At block 800, a wireless communication device, such as a UE, transmits a sidelink transmission in a first slot of an unlicensed channel. For example, the UE 115 transmits a sidelink control message and/or sidelink data transmission in a 5G NR channel, as described with reference to FIGS. 4-6.

At block 801, the UE 115 determines a second slot of the unlicensed channel to receive HARQ feedback for the sidelink transmission. For example, the UE 115 determines whether one or more HARQ timelines are configured for the transmitted sidelink transmission and determines one or more resources based on the first slot and the one or more HARQ timelines, as described with reference to FIGS. 4-6. The UE 115 may then select a particular resource (e.g., slot) or resources of the determined resources to monitor for HARQ feedback for the sidelink transmission.

At block 802, the UE 115 optionally determines a CA operation for a HARQ feedback transmission for the sidelink transmission. For example, the UE 115 may determine a particular CA operation for the second slot which is to occur before the HARQ feedback transmitted, as described with reference to FIGS. 4-6. To illustrate, the UE 115 may determine a particular CA operation as described with reference to FIGS. 6 and 7. However, the UE 115 may not need to determine which CA operation that the other UE is to perform in some implementations. The UE 115 may just monitor the second slot based on the sidelink transmission or monitor the second slot based on the other UE successfully performing a CA operation.

At block 803, the UE 115 receives the HARQ feedback transmission in the second slot based on another UE successfully performing the CA operation. For example, the UE 115 monitors the second slot for the HARQ feedback transmission responsive to determining the second slot and/or responsive to a successful CA operation by the other UE. To illustrate, the UE 115 may determine that a device of its network has transmitted in the second slot and/or that no device of another network has transmitted in the second slot, and the UE 115 may monitor for the HARQ feedback after a delay associated with the CA operation for the other UE.

The UE 115 may execute additional blocks (or the UE 115 may be configured further perform additional operations) in other implementations. For example, the UE 115 may perform one or more operations described above or as described with reference to FIG. 7. As another example, the UE 115 may perform one or more aspects as presented below.

In a first aspect, the UE is configured with multiple HARQ feedback resources for transmission of the HARQ feedback, wherein the second slot includes at least one HARQ feedback resource of the multiple HARQ feedback resources for the HARQ feedback.

In a second aspect, alone or in combination with the first aspect, each of the HARQ feedback resources is configured with a HARQ feedback time gap, wherein the second slot is determined based at least on a first HARQ feedback time gap of the multiple HARQ feedback time gaps.

In a third aspect, alone or in combination with one or more of the above aspects, the UE is configured with multiple HARQ feedback resource sets for the HARQ feedback in the unlicensed channel, wherein each of the HARQ feedback resource sets has an associated HARQ feedback time gap, wherein the second slot comprises HARQ feedback resource in a first resource set of the multiple resource sets.

In a fourth aspect, alone or in combination with one or more of the above aspects, UE is configured with multiple HARQ feedback time gaps for a sidelink communication in the unlicensed channel, wherein the second slot is determined based at least on a first HARQ feedback time gap of the multiple HARQ feedback time gaps.

In a fifth aspect, alone or in combination with one or more of the above aspects, determining the second slot to transmit the HARQ feedback for the transmission includes: determining, by the UE, a plurality of slots to transmit the HARQ feedback for the sidelink transmission, wherein the second slot is a particular slot of the plurality of slots.

In a sixth aspect, alone or in combination with one or more of the above aspects, the UE 115 refrains from monitoring the HARQ feedback in a third slot of the plurality of slots based on successfully receiving the HARQ feedback in the second slot; wherein the third slot is a subsequent slot of the second slot.

In a seventh aspect, alone or in combination with one or more of the above aspects, the UE 115 determines a third slot of the plurality of slots to transmit the HARQ feedback for the transmission; determining, by the UE, a second CA operation for the HARQ feedback in the third determined slot; and refraining from monitoring, by the UE, a second HARQ feedback transmission in the third determined slot based on the other UE not successfully performing the second CA operation.

In an eighth aspect, alone or in combination with one or more of the above aspects, the UE 115 receives a second HARQ feedback transmission in a third determined slot of the plurality of slots based on successfully performing a second CA operation, the second HARQ feedback transmission corresponds to a sidelink channel transmission in the unlicensed channel.

In a ninth aspect, alone or in combination with one or more of the above aspects, determining the CA operation for the HARQ feedback in the determined slot includes: determining, by the UE, the CA operation for the HARQ feedback based on UE configuration settings.

In a tenth aspect, alone or in combination with one or more of the above aspects, the UE 115 receives a RRC message indicating the UE configuration settings.

In an eleventh aspect, alone or in combination with one or more of the above aspects, determining the CA operation for the HARQ feedback in the determined slot includes: determining, by the UE, the CA operation for the HARQ feedback based on receiving a sidelink communication prior to the HARQ feedback transmission.

In a twelfth aspect, alone or in combination with one or more of the above aspects, the sidelink communication is transmitted in a sidelink shared channel resource of the second slot, which precedes the HARQ feedback resource in the second slot.

In a thirteenth aspect, alone or in combination with one or more of the above aspects, determining the CA operation for the HARQ feedback in the determined slot further includes: determining, by the UE, the CA operation for the HARQ feedback further based on UE configuration settings, a gap configuration of the slot (e.g., gap configuration settings), or both.

In a fourteenth aspect, alone or in combination with one or more of the above aspects, determining the CA operation for the HARQ feedback in the determined slot includes: determining a simplified CA operation for the HARQ feedback transmission based on transmitting or receiving a sidelink communication prior to the HARQ feedback transmission, the simplified CA operation includes a CA operation without random back-off, a CA operation without energy detection, or both.

In a fifteenth aspect, alone or in combination with one or more of the above aspects, determining the CA operation for the HARQ feedback in the determined slot includes: determining, by the UE, the CA operation for the HARQ feedback based on a received sidelink control message (e.g., based on an indication of the sidelink control message).

In a sixteenth aspect, alone or in combination with one or more of the above aspects, the sidelink control message is a SCI, and wherein the SCI indicates a category or a type of the CA operation (e.g., includes a CA indicator).

In a seventeen aspect, alone or in combination with one or more of the above aspects, the UE 115 determines the type of the CA operation for the HARQ feedback further based on UE settings, a gap configuration, or both.

In an eighteenth aspect, alone or in combination with one or more of the above aspects, determining the second slot to transmit HARQ feedback for the sidelink transmission, comprises: determining a frame period for HARQ feedback transmission, wherein the frame period is the same as a HARQ feedback resource period, and wherein the second slot of the unlicensed channel is an initial slot of the frame period.

In a nineteenth aspect, alone or in combination with one or more of the above aspects, the UE is configured with a number of transmission settings for HARQ feedback.

In a twentieth aspect, alone or in combination with one or more of the above aspects, the CA operation includes a type 1 operation or a type 2 operation, wherein a type 1 operation includes a CA operation with a random back-off, a variable size contention window, or both. and wherein a type 2 operation includes a CA operation without a random back-off.

In a twenty-first aspect, alone or in combination with one or more of the above aspects, the type 2 operation includes a CA operation without energy detection (e.g., a LBT CAT 1 operation), a CA operation with an energy detection in a sensing duration of 16 microseconds (μs) (e.g., a LBT CAT 2 operation), or a CA operation with an energy detection in a sensing duration of 25 μs (e.g., a LBT CAT 2 operation).

In a twenty-second aspect, alone or in combination with one or more of the above aspects, the first slot and the second slot are in the same channel occupancy.

In a twenty-third aspect, alone or in combination with one or more of the above aspects, the second slot is determined based at least on the first HARQ feedback time gap of the multiple HARQ feedback time gaps, and the UE 115 determines a HARQ feedback resource in the second slot based at least on the first HARQ feedback time gap.

In a twenty-fourth aspect, alone or in combination with one or more of the above aspects, determining the CA operation for the HARQ feedback in the determined slot includes: determining, by the UE, the CA operation for the HARQ feedback based on transmitting a sidelink communication prior to the HARQ feedback transmission, wherein the sidelink communication is transmitted in a sidelink shared channel resource of the second slot, which precedes the HARQ feedback resource in the second slot. If the two transmissions of the second slot have no gap in between them (or have a gap smaller than a threshold), the two transmissions are considered continuous and thus there may be no need to perform LBT/sensing prior to HARQ feedback transmission (or at least no need to do Type 1 channel access).

Accordingly, a UE and a base station may perform enhanced HARQ operations. By performing HARQ operations, throughput and reliability may be increased and such operations may enable increased spectrum sharing for sidelink operations with reduced capability (e.g., less advanced) devices.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to HARQ operations may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 7 and 8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
receiving, by a user equipment (UE), a sidelink transmission in a first slot of an unlicensed channel;
performing, by the UE, a Channel Access (CA) operation for a hybrid automatic repeat request (HARQ) feedback transmission in a second slot for the sidelink transmission, the second slot is one of multiple slots configured for HARQ feedback for the sidelink transmission, wherein the UE is configured with multiple HARQ feedback resources for transmission of the HARQ feedback for the sidelink transmission, and wherein a first HARQ feedback resource of the multiple HARQ feedback resources and a second HARQ feedback resource of the multiple HARQ feedback resources have non-overlapping frequency resources; and
transmitting, by the UE, the HARQ feedback transmission in the first HARQ feedback resource in the second slot based on successfully performing the CA operation.

2. The method of claim 1, further comprising:
determining, by the UE, the second slot of the unlicensed channel to transmit the HARQ feedback for the sidelink transmission, wherein a plurality of HARQ feedback resources of the multiple HARQ feedback resources have different, non-overlapping frequency resources frequency resources.

3. The method of claim 1, wherein the UE is configured with multiple HARQ feedback resource sets for the HARQ feedback in the unlicensed channel, wherein each of the HARQ feedback resource sets has an associated HARQ feedback time gap, wherein the second slot comprises the first HARQ feedback resource in a first resource set of the multiple HARQ resource sets.

4. The method of claim 1, further comprising:
determining, by the UE, the second slot of the unlicensed channel to transmit the HARQ feedback for the sidelink transmission, wherein the UE is configured with multiple HARQ feedback time gaps for a sidelink communication in the unlicensed channel, wherein the second slot is determined based at least on a first HARQ feedback time gap of the multiple HARQ feedback time gaps.

5. The method of claim 4, wherein the second slot is determined based at least on the first HARQ feedback time gap of the multiple HARQ feedback time gaps, and further comprising:
determining, by the UE, a HARQ feedback resource in the second slot based at least on the first HARQ feedback time gap.

6. The method of claim 1, further comprising:
determining, by the UE, a plurality of slots to transmit the HARQ feedback for the sidelink transmission, wherein the second slot is a particular slot of the plurality of slots, and further comprising; and
refraining from transmitting, by the UE, the HARQ feedback in a third slot of the plurality of slots based on successfully transmitting the HARQ feedback in the second slot, wherein the third slot is subsequent to the second slot.

7. The method of claim 1, further comprising:
determining, by the UE, a plurality of slots to transmit the HARQ feedback for the sidelink transmission, wherein the second slot is a particular slot of the plurality of slots;
determining, by the UE, a third slot of the plurality of slots to transmit the HARQ feedback for the sidelink transmission;
determining, by the UE, a second CA operation for the HARQ feedback in the third slot; and
refraining from transmitting, by the UE, a second HARQ feedback transmission in the second HARQ feedback resource in the third slot based on not successfully performing the second CA operation, wherein the second HARQ feedback resource is part of a second HARQ feedback resource set different from a first HARQ feedback resource set that includes the HARQ feedback resource.

8. The method of claim 1, further comprising:
determining, by the UE, a plurality of slots to transmit the HARQ feedback for the sidelink transmission, wherein the second slot is a particular slot of the plurality of slots;
determining, by the UE, a third slot of the plurality of slots to transmit the HARQ feedback for the sidelink transmission;
determining, by the UE, a second CA operation for the HARQ feedback in the third slot; and
transmitting, by the UE, a second HARQ feedback transmission in the third slot of the plurality of slots based on successfully performing the second CA operation.

9. The method of claim 1, further comprising:
determining, by the UE, the CA operation for the HARQ feedback transmission in the second slot based on UE configuration settings.

10. An apparatus configured for wireless communication, comprising:
at least one processor; and
a memory coupled to the at least one processor, wherein the at least one processor is configured to:
receive a sidelink transmission in a first slot of an unlicensed channel;
perform a Channel Access (CA) operation for a hybrid automatic repeat request (HARQ) feedback transmission in a second slot for the sidelink transmission, the second slot is one of multiple slots configured for HARQ feedback for the sidelink transmission, wherein the apparatus is configured with multiple HARQ feedback resources for transmission of the HARQ feedback for the sidelink transmission, and wherein a first HARQ feedback resource of the multiple HARQ feedback resources and a second HARQ feedback resource of the multiple HARQ feedback resources have non-overlapping frequency resources; and
transmit the HARQ feedback transmission in the first HARQ feedback resource in the second slot based on successfully performing the CA operation.

11. The apparatus of claim 10, wherein the at least one processor is further configured to:
determine the second slot of the unlicensed channel to transmit the HARQ feedback for the sidelink transmission, wherein the apparatus is configured with multiple HARQ feedback resources for transmission of the HARQ feedback for the sidelink transmission, wherein the second slot includes at least one HARQ feedback resource of the multiple HARQ feedback resources for the HARQ feedback.

12. The apparatus of claim 11, wherein the at least one processor is further configured to:
determine the CA operation for the HARQ feedback based on receiving a sidelink communication prior to the HARQ feedback transmission.

13. The apparatus of claim 12, wherein the sidelink communication is transmitted in a sidelink shared channel resource of the second slot, which precedes a HARQ feedback resource, of the multiple HARQ feedback resources, for the HARQ feedback transmission in the second slot.

14. The apparatus of claim 12, wherein the at least one processor is further configured to:
determine the CA operation for the HARQ feedback transmission further based on device configuration settings, a gap configuration of the second slot, or both.

15. The apparatus of claim 10, wherein the at least one processor is further configured to:
determine a type of the CA operation for the HARQ feedback transmission based on transmitting a sidelink communication prior to the HARQ feedback transmission, wherein the sidelink communication is transmitted in a sidelink shared channel resource of the second slot which precedes a HARQ feedback resource for the HARQ feedback in the second slot.

16. The apparatus of claim 10, wherein the at least one processor is further configured to:
determine to use a simplified CA operation for the HARQ feedback transmission based on receiving or transmitting a sidelink communication prior to the HARQ feedback transmission, the simplified CA operation includes a CA operation without random back-off, a CA operation without energy detection, or both.

17. The apparatus of claim 10, wherein the at least one processor is further configured to:
determine the CA operation for the HARQ feedback transmission based on a received sidelink control message, wherein the received sidelink control message is a sidelink control information (SCI), and wherein the SCI indicates a category or a type of the CA operation.

18. The apparatus of claim 17, wherein the at least one processor is further configured to:
determine the type of the CA operation for the HARQ feedback transmission further based on device settings, a gap configuration, or both.

19. A method of wireless communication comprising:
transmitting, by a user equipment (UE), a sidelink transmission in a first slot of an unlicensed channel;
determining, by the UE, a second slot of the unlicensed channel to receive hybrid automatic repeat request (HARQ) feedback for the sidelink transmission, the second slot is one of multiple slots configured for HARQ feedback for the sidelink transmission, wherein the UE is configured with multiple HARQ feedback resources for reception of the HARQ feedback for the sidelink transmission, and wherein a first HARQ feedback resource of the multiple HARQ feedback resources and a second HARQ feedback resource of the multiple HARQ feedback resources have non-overlapping frequency resources; and
receiving, by the UE, a HARQ feedback transmission for the sidelink transmission in the first HARQ feedback resource in the second slot based on another UE successfully performing a Channel Access (CA) operation.

20. The method of claim 19, further comprising:
determining, by the UE, the second slot of the unlicensed channel to transmit the HARQ feedback for the sidelink transmission, wherein the UE is configured with multiple HARQ feedback resources for transmission of the HARQ feedback for the sidelink transmission, wherein the second slot includes at least one HARQ feedback resource of the multiple HARQ feedback resources for the HARQ feedback.

21. The method of claim 20, wherein determining the second slot to transmit the HARQ feedback for the sidelink transmission includes:
determining, by the UE, a plurality of slots to transmit the HARQ feedback for the sidelink transmission, wherein the second slot is a particular slot of the plurality of slots.

22. The method of claim 21, further comprising:
refraining from monitoring, by the UE, for the HARQ feedback in a third slot of the plurality of slots based on successfully receiving the HARQ feedback transmission in the second slot, wherein the third slot is subsequent to the second slot.

23. The method of claim 21, further comprising:
determining, by the UE, a third slot of the plurality of slots to transmit the HARQ feedback for the sidelink transmission;
determining, by the UE, a second CA operation for the HARQ feedback in the third slot; and
refraining from monitoring, by the UE, for a second HARQ feedback transmission in the third slot based on the other UE not successfully performing the second CA operation.

24. The method of claim 21, further comprising:
receiving, by the UE, a second HARQ feedback transmission in a third slot of the plurality of slots based on successfully performing a second CA operation, the second HARQ feedback transmission corresponds to a sidelink channel transmission in the unlicensed channel.

25. An apparatus configured for wireless communication, comprising:
at least one processor; and
a memory coupled to the at least one processor,
wherein the at least one processor is configured to:
transmit a sidelink transmission in a first slot of an unlicensed channel;
determine a second slot of the unlicensed channel to receive hybrid automatic repeat request (HARQ) feedback for the sidelink transmission, the second slot is one of multiple slots configured for HARQ feedback for the sidelink transmission, wherein the apparatus is configured with multiple HARQ feedback resources for reception of the HARQ feedback for the sidelink transmission, and wherein a first HARQ feedback resource of the multiple HARQ feedback resources has different frequency resources and a second HARQ feedback resource of the multiple HARQ feedback resources have non-overlapping frequency resources; and
receive a HARQ feedback transmission for the sidelink transmission in the first HARQ feedback resource in the second slot based on another device successfully performing a Channel Access (CA) operation.

26. The apparatus of claim 25, wherein the CA operation includes a type 1 operation or a type 2 operation, wherein a type 1 operation includes a CA operation with a random back-off, a variable size contention window, or both wherein a type 2 operation includes a CA operation without a random back-off, and wherein the type 2 operation includes a CA operation without energy detection, a CA operation with an energy detection in a sensing duration of 16 microseconds (us), or a CA operation with an energy detection in a sensing duration of 25 us.

27. The apparatus of claim 25, wherein the first slot and the second slot are in the same channel occupancy.

28. The method of claim 1, wherein the first HARQ feedback resource has different time resources than the second HARQ feedback resource.

29. The method of claim 1, wherein the first HARQ feedback resource is associated with a first HARQ timeline different from a second HARQ timeline associated with the second HARQ feedback resource.

30. The method of claim 1, wherein the multiple HARQ feedback resources include a first HARQ feedback resource set that includes the first HARQ feedback resource and a second HARQ feedback resource set includes the second HARQ feedback resource, wherein the first HARQ feedback resource set has a first HARQ timeline is different from a second HARQ timeline of the second HARQ feedback resource set.

* * * * *